US010781668B2

(12) United States Patent
McMullen

(10) Patent No.: US 10,781,668 B2
(45) Date of Patent: Sep. 22, 2020

(54) DOWNHOLE POWER GENERATION

(71) Applicant: Upwing Energy, LLC, Cerritos, CA (US)

(72) Inventor: Patrick McMullen, Villa Park, CA (US)

(73) Assignee: Upwing Energy, LLC, Cerritos, CA (US)

( * ) Notice: Subject to any disclaimer, the term of this patent is extended or adjusted under 35 U.S.C. 154(b) by 215 days.

(21) Appl. No.: 15/857,492

(22) Filed: Dec. 28, 2017

(65) Prior Publication Data

US 2018/0183377 A1    Jun. 28, 2018

Related U.S. Application Data

(63) Continuation-in-part of application No. 15/392,341, filed on Dec. 28, 2016, now Pat. No. 10,584,533.

(51) Int. Cl.
| | |
|---|---|
| *E21B 41/00* | (2006.01) |
| *H02P 27/06* | (2006.01) |
| *H02M 7/06* | (2006.01) |
| *E21B 43/12* | (2006.01) |
| *H02M 3/158* | (2006.01) |

(Continued)

(52) U.S. Cl.
CPC ........ *E21B 41/0085* (2013.01); *E21B 43/128* (2013.01); *H02M 3/1582* (2013.01); *H02M 7/06* (2013.01); *H02P 27/04* (2013.01); *H02P 27/06* (2013.01); *E21B 33/12* (2013.01); *E21B 41/00* (2013.01)

(58) Field of Classification Search
CPC .......................... E21B 41/0085; E21B 43/128
See application file for complete search history.

(56) References Cited

U.S. PATENT DOCUMENTS

| | | |
|---|---|---|
| 4,184,545 A | 1/1980 | Claycomb |
| 4,329,127 A | 5/1982 | Tschirky et al. |
| 5,265,682 A | 11/1993 | Russell et al. |
| (Continued) | | |

FOREIGN PATENT DOCUMENTS

| | | |
|---|---|---|
| EP | 1632636 A1 | 3/2006 |
| GB | 2501352 B | 11/2017 |
| WO | WO96/05646 A2 | 2/1996 |

OTHER PUBLICATIONS

PCT International Search Report and Written Opinion of the International Searching Authority, PCT/US2017/068124, dated Mar. 15, 2018, 12 pages.

(Continued)

*Primary Examiner* — Kristyn A Hall
(74) *Attorney, Agent, or Firm* — Fish & Richardson P.C.

(57) ABSTRACT

Providing power to a downhole-type tool includes positioning a downhole-type electric motor in a wellbore, electrically connecting a variable speed drive to the electric motor with three-phase conductors extending between the variable speed drive and the electric motor, where the variable speed drive controls and supplies power to the electric motor through the three-phase conductors, diverting at least a portion of a power supply from the three-phase conductors to a rectifier, and supplying, from the rectifier, the diverted portion of the power supply to at least one downhole-type tool proximate to the electric motor, the at least one downhole-type tool operable using the diverted portion of the power supply.

32 Claims, 9 Drawing Sheets

(51) Int. Cl.
*H02P 27/04* (2016.01)
*E21B 33/12* (2006.01)

(56) References Cited

U.S. PATENT DOCUMENTS

| | | |
|---|---|---|
| 5,912,519 A | 6/1999 | Horner |
| 6,045,333 A * | 4/2000 | Breit ............... F04B 47/06 417/42 |
| 6,250,806 B1 | 6/2001 | Beshoory |
| 6,439,866 B1 | 8/2002 | Farkas et al. |
| 6,557,642 B2 | 5/2003 | Head |
| 7,327,634 B2 | 2/2008 | Perry et al. |
| 7,407,020 B2 | 8/2008 | Gleitman et al. |
| 7,504,752 B2 | 3/2009 | Head |
| 8,487,493 B2 | 7/2013 | Cunningham et al. |
| 8,944,185 B2 | 2/2015 | Scholz et al. |
| 9,303,454 B2 | 4/2016 | Scholz et al. |
| 9,601,964 B2 | 3/2017 | Cunningham et al. |
| 2003/0132003 A1 | 7/2003 | Arauz et al. |
| 2006/0048957 A1 | 3/2006 | Oksman |
| 2015/0034294 A1 | 2/2015 | Miles et al. |
| 2015/0114632 A1 | 4/2015 | Romer et al. |
| 2015/0316072 A1 | 11/2015 | Cunningham et al. |
| 2015/0322756 A1 | 11/2015 | Cunningham et al. |
| 2015/0326094 A1 | 11/2015 | Cunningham et al. |
| 2015/0345260 A1 | 12/2015 | Green et al. |
| 2015/0372502 A1 | 12/2015 | Murayama |
| 2016/0123123 A1 | 5/2016 | Maclean |
| 2016/0333677 A1 | 11/2016 | Westberg et al. |
| 2017/0324273 A1 * | 11/2017 | Hadler-Jacobsen .... H02J 13/00 |

OTHER PUBLICATIONS

PCT International Search Report and Written Opinion issued in International Application No. PCT/US2018/067221 dated Mar. 13, 2019, 12 pages.

* cited by examiner

DOWNHOLE POWER GENERATION

CLAIM OF PRIORITY

This application is a continuation-in-part of and claims the benefit of priority to U.S. patent application Ser. No. 15/392,341, entitled "Downhole Blower System with Pin Bearing," filed Dec. 28, 2016, which is incorporated herein by reference in its entirety.

TECHNICAL FIELD

This disclosure relates to providing power to a downhole-type tool.

BACKGROUND

In downhole applications, downhole tools with motors are employed for various processes, such as pumping, compressing, blowing, or otherwise moving well fluids in a wellbore. Downhole tools with motors are typically driven from a surface location and therefore often require power to be transmitted over long distances from a power source to the downhole tool.

SUMMARY

This disclosure describes systems and methods for providing power to a tool, for example, a downhole-type tool in a wellbore.

Some aspects of the disclosure encompass a method for providing power to a downhole-type tool. The method includes positioning a downhole-type electric motor in a wellbore, electrically connecting a variable speed drive to the electric motor with three-phase conductors extending between the variable speed drive and the electric motor, the variable speed drive to control and supply power to the electric motor through the three-phase conductors, diverting at least a portion of a power supply from the three-phase conductors to a rectifier, and supplying, from the rectifier, the diverted portion of the power supply to at least one downhole-type tool proximate to the electric motor, the at least one downhole-type tool operable using the diverted portion of the power supply.

This, and other aspects, can include one or more of the following features. Electrically connecting the variable speed drive and the electric motor can include supplying the power supply from the variable speed drive to the electric motor across the three-phase conductors. Electrically connecting the variable speed drive and the electric motor can include providing the power supply from the motor to the three-phase conductors, the power supply including a back electromotive force of the electric motor. The method can include, in response to diverting at least a portion of the power supply from the three-phase conductors to the rectifier, converting the diverted portion of the power supply with the rectifier to a direct current supply, and supplying the diverted portion of the power supply to the at least one downhole-type tool proximate the electric motor can include supplying the direct current supply to the at least one downhole-type tool. The variable speed drive can be positioned at least 100 meters uphole of the electric motor. The variable speed drive can be positioned at a tophole location of the wellbore. Diverting at least a portion of the power supply from the three-phase conductors can include directing the portion of the power supply through a secondary conductor connected to at least one of the three-phase conductors. The secondary conductor can connect to the at least one of the three-phase conductors at a terminal of the electric motor. The rectifier can include a voltage regulator, and where supplying the diverted portion of the power supply to the at least one downhole-type tool can include smoothing an output voltage of the diverted portion of the power supply with the voltage regulator. The voltage regulator can include a buck converter, the buck converter to provide a constant voltage output to the at least one downhole-type tool. The voltage regulator can include a buck-boost converter, the buck-boost converter to provide a constant voltage output to the at least one downhole-type tool. The at least one downhole-type tool can include a sensor, a magnetic bearing, a generator, a damper, a communication device, or a combination of these.

In certain aspects, a system for providing power to a downhole-type tool includes a downhole-type electric motor to be positioned in a wellbore, a variable speed drive electrically connected to the electric motor by three-phase conductors extending between the variable speed drive and the electric motor, the variable speed drive to control and supply power to the electric motor through the three-phase conductors, and a rectifier electrically connected to at least one conductor of the three-phase conductors, the rectifier to direct at least a portion of a power supply from the three-phase conductors and supply the at least a portion of the power supply to at least one downhole-type tool proximate to the electric motor, the at least one downhole-type tool being operable using the portion of the power supply.

This, and other aspects, can include one or more of the following features. The at least one downhole-type tool can include at least one of a sensor, a magnetic bearing, a generator, a damper, or a communication device. The three-phase conductors can provide the power supply from the variable speed drive to the electric motor. The electric motor can supply a back electromotive force to the three-phase conductors, the portion of the power supply including the back electromotive force from the electric motor. The rectifier can convert the portion of the power supply to a direct current supply and supply the direct current supply to the at least one downhole-type tool. The variable speed drive can be positioned at least 100 meters uphole of the electric motor. The variable speed drive can be positioned at a tophole location of the wellbore. The system can include a secondary conductor electrically connecting the at least one conductor of the three-phase conductors to the rectifier. The secondary conductor can connect to the at least one of the three-phase conductors at a terminal of the electric motor. The rectifier can include a voltage regulator to smooth an output voltage of the diverted portion of the power supply. The voltage regulator can include a buck converter, the buck converter to provide a constant voltage output to the at least one downhole-type tool. The voltage regulator can include a buck-boost converter, the buck-boost converter to provide a constant voltage output to the at least one downhole-type tool.

Certain aspects of the disclosure encompass a method for providing power to a tool. The method includes positioning an electric motor separate from a variable speed drive at a distance of at least 100 meters, electrically connecting the variable speed drive to the electric motor with three-phase conductors extending between the variable speed drive and the electric motor, the variable speed drive to control and supply power to the electric motor through the three-phase conductors, diverting at least a portion of a power supply from the three-phase conductors to a rectifier, and supplying, from the rectifier, the diverted portion of the power supply to an electric device proximate to the electric motor, the electric device operable using the diverted portion of the power supply.

This, and other aspects, can include one or more of the following features. The electric device can include at least one of a sensor, a magnetic bearing, a generator, a damper, or a communication device.

The details of one or more implementations of the subject matter described in this disclosure are set forth in the accompanying drawings and the description below. Other features, aspects, and advantages of the subject matter will become apparent from the description, the drawings, and the claims.

BRIEF DESCRIPTION OF THE DRAWINGS

Like reference numbers and designations in the various drawings indicate like elements.

DETAILED DESCRIPTION

Figure 1:
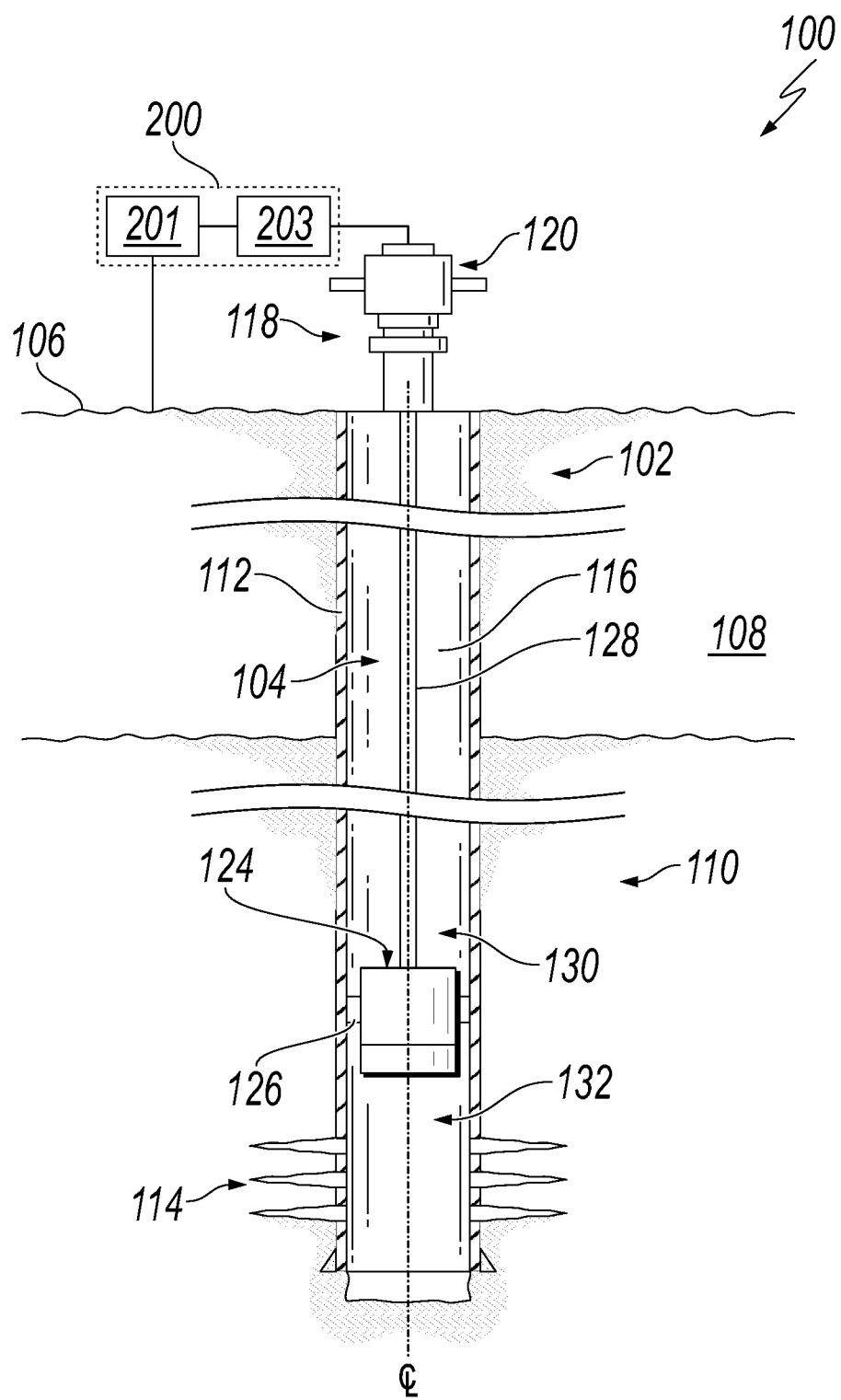
FIG. 1 is a schematic side view of an example well system including a downhole-type system.

Reliably providing power to and operating downhole-type equipment in a harsh downhole environment is sometimes difficult due to the presence of caustic fluids, pressures, and temperatures, and a relative distance between the downhole equipment and any supporting equipment (e.g., surface equipment) that cannot be repackaged to fit in a small diameter tube. For example, many downhole systems exclude certain downhole-type tools that require power, or require dedicated power lines extending from a surface power unit to the downhole-type tools. These tools include electronics, sensors, actuators, bearings, and other equipment that can be incorporated into a downhole system. However, conventional use of electrical cabling and connectors to provide power to downhole-type tools requiring power (e.g., electronics, sensors, actuators, bearings, dampers, and others) present reliability concerns, for example, due to degradation when subject to exposure to caustic well fluids, degradation in their deployment into a well, and a lack of reliability with cable lengths of hundreds or thousands of meters. For example, dedicated power lines extending from a surface that is at least hundreds of meters apart from the downhole-type tools can suffer losses along their length and be unreliable. A harsh downhole environment and a long distance between a tophole power source and a downhole-type tool can cause difficulty in providing power to the downhole-type tool, limiting the availability and reliability of tools (e.g., electronics or other tools requiring power) for downhole systems. Also, conventional use of electrical cabling and connectors can be expensive, and is done more for short term testing and evaluation and not for long term operation.

While all these issues and risks exist for downhole operations, the potential benefit of well intervention with production-enhancing tools, measurement equipment, electronics, and other downhole-type tools is often worth the risk because of the enhanced production it can offer, among other benefits. While these benefits have been demonstrated, reliability and robustness of equipment in this harsh and remote environment is not close to conventional topside mounted equipment, and providing power to the downhole equipment can be difficult. The concepts described here improve reliability and availability of power for downhole-type tools and equipment, for example, without requiring dedicated electrical cabling extending from a remote power source. For example, the described technology can be implemented as a local downhole power generator integrated into or separate from a motor drive, and/or as a local downhole power source that taps power from variable speed drive conductors that power the motor drive. The variable speed drive conductors can be three-phase conductors that power and control the motor drive. Locally generating, diverting, and/or supplying power at a downhole location makes power available in the downhole environment for local electronics, sensors, actuators, bearings, dampers, or other downhole-type tools that require power, without requiring dedicated power cables and connectors from a remote (e.g., tophole) location to these downhole-type tools. The concepts described herein regard the local generation of power in a downhole environment from a downhole motor drive or utilizing existing power delivery systems such as a variable speed drive (VSD) connected to the motor via three-phase conductors.

In some implementations, a generator on a shaft of a motor, pump, or other rotating rotor device generates power when the rotor is rotating. The generator provides a variable voltage and frequency to one or more downhole-type tools directly to the downhole-type tools or via a rectifier that rectifies the variable voltage and frequency to direct current (DC) and regulate the voltage to a magnitude appropriate for the operation of the one or more downhole-type tools.

In some implementations, a VSD provides power and control to a downhole-type motor, and one or more downhole-type tools can connect to a conductor of the VSD and/or a motor terminal (e.g., stator lead of an electric motor) on the downhole-type motor via a rectifier that rectifies the variable VSD signal to provide a fixed voltage DC to the one or more downhole-type tools requiring power. In certain implementations, the rectifier connects to the VSD conductor and/or the motor terminal and receives a motor back electromagnetic field (BEMF) when the motor is operating. The rectifier can provide voltage regulation to convert the BEMF to a DC output to feed the one or more downhole-type tools requiring power.

FIG. 1 depicts an example well system 100 constructed in accordance with the concepts herein. The well system 100 includes a well 102 having a wellbore 104 that extends from the surface 106 through the Earth 108 to one more subterranean zones of interest 110 (one shown). The well system 100 enables access to the subterranean zones of interest 110 to allow recovery, i.e., production, of fluids to the surface 106 and, in certain instances, additionally or alternatively allows fluids to be placed in the earth 108. In certain instances, the subterranean zone 110 is a formation within the Earth 108 defining a reservoir, but in other instances, the zone 110 can be multiple formations or a portion of a formation. For simplicity's sake, the well 102 is shown as a vertical well with a vertical wellbore 104, but in other instances, the well 102 could be a deviated well with the wellbore 104 deviated from vertical (e.g., horizontal or slanted) and/or the wellbore 104 could be one of the multiple bores of a multilateral well (i.e., a well having multiple lateral wells branching off another well or wells).

In certain instances, the well system 100 is a gas well that is used in producing natural gas from the subterranean zones of interest 110 to the surface 106. While termed a "gas well," the well need not produce only dry gas, and may incidentally or in much smaller quantities, produce liquid including oil and/or water. In certain instances, the production from the well 102 can be multiphase in any ratio, and/or despite being a gas well, the well can produce mostly or entirely liquid at certain times and mostly or entirely gas at other times. For example, in certain types of wells it is common to produce water for a period of time to gain access to the gas in the subterranean zone. The concepts herein, though, are not limited in applicability to gas wells or even production wells, and could be used in wells for producing liquid resources such as oil, water or other liquid resource, and/or could be used in injection wells, disposal wells or other types of wells used in placing fluids into the Earth.

The wellbore 104 is typically, although not necessarily, cylindrical. All or a portion of the wellbore 104 is lined with a tubing, i.e., casing 112. The casing 112 connects with a wellhead 118 at the surface 106 and extends downhole into the wellbore 104. The casing 112 operates to isolate the bore of the well 102, defined in the cased portion of the well 102 by the inner bore 116 of the casing 112, from the surrounding earth 108. The casing 112 can be formed of a single continuous tubing or multiple lengths of tubing joined (e.g., threadedly and/or otherwise) end-to-end. In FIG. 1, the casing 112 is perforated (i.e., having perforations 114) in the subterranean zone of interest 110 to allow fluid communication between the subterranean zone of interest 110 and the bore 116 of the casing 112. In other instances, the casing 112 is omitted or ceases in the region of the subterranean zone of interest 110. This portion of the wellbore 104 without casing is often referred to as "open hole."

The wellhead 118 defines an attachment point for other equipment of the well system 100 to be attached to the well 102. For example, FIG. 1 shows well 102 being produced with a Christmas tree 120 attached the wellhead 118. The Christmas tree 120 includes valves used to regulate flow into or out of the well 102.

The well system 100 includes a downhole-type system 124 residing in the wellbore 104, for example, at a depth that is nearer to the subterranean zone 110 than the surface 106. The downhole-type system 124 includes a rotating device with a rotor (not shown) configured to rotate about a longitudinal axis (e.g., parallel to a centerline of the wellbore 104). The downhole-type system 124 can take many forms, and perform a variety of functions based on the type of well operation intended for the well system 100. For example, the downhole-type system 124 can include a motor, a compressor, a blower, a pump, an impeller, a multiphase fluid flow aid, a thrust bearing assembly, and/or another device that includes a rotor that rotates during operation.

In some examples, the downhole-type system 124, being of a type configured in size and robust construction for installation within a well 102, can be any type of rotating equipment that can assist production of fluids to the surface 106 and out of the well 102 by creating an additional pressure differential within the well 102. The casing 112 can be commercially produced in a number of common sizes specified by the American Petroleum Institute (the "API), including 4½, 5, 5½, 6, 6⅝, 7, 7⅝, 16/8, 9⅝, 10¾, 11¾, 13⅜, 16, 116/8 and 20 inches, and the API specifies internal diameters for each casing size. The downhole-type system 124 can be configured to fit in, and (as discussed in more detail below) in certain instances, seal to the inner diameter of one of the specified API casing sizes. Of course, the downhole-type system 124 can be made to fit in and, in certain instances, seal to other sizes of casing or tubing or otherwise seal to the wall of the wellbore 104.

Additionally, as a downhole-type system 124, the construction of its components are configured to withstand the impacts, scraping, and other physical challenges the system 124 will encounter while being passed hundreds of feet/meters or even multiple miles/kilometers into and out of the wellbore 104. For example, the downhole-type system 124 can be disposed in the wellbore 104 at a depth of up to 15,000 feet (4,572 meters). Beyond just a rugged exterior, this encompasses having certain portions of any electronics being ruggedized to be shock resistant and remain fluid tight during such physical challenges and during operation. Additionally, the downhole-type system 124 is configured to withstand and operate for extended periods of time (e.g., multiple weeks, months or years) at the pressures and temperatures experienced in the wellbore 104, which temperatures can exceed 400° F./205° C. and pressures over 2,000 pounds per square inch, and while submerged in the well fluids (gas, water, or oil as examples). Finally, as a downhole-type system 124, the system 124 can be configured to interface with one or more of the common deployment systems, such as jointed tubing (i.e., lengths of tubing joined end-to-end, threadedly and/or otherwise), a sucker rod, coiled tubing (i.e., not-jointed tubing, but rather a continuous, unbroken and flexible tubing formed as a single piece of material), or wireline with an electrical conductor (i.e., a monofilament or multifilament wire rope with one or more electrical conductors, sometimes called e-line) and thus have a corresponding connector (for example, a jointed tubing connector, coiled tubing connector, or wireline connector). In FIG. 1, the system 124 is shown deployed on wireline 128.

A seal system 126 integrated or provided separately with a downhole system, as shown with the downhole-type system 124, divides the well 102 into an uphole zone 130 above the seal system 126 and a downhole zone 132 below the seal system 126. FIG. 1 shows the downhole-type system 124 positioned in the open volume of the bore 116 of the casing 112, and not within or a part of another string of tubing in the well 102. The wall of the wellbore 104 includes the interior wall of the casing 112 in portions of the wellbore 104 having the casing 112, and includes the open hole wellbore wall in uncased portions of the wellbore 104. Thus, the seal system 126 is configured to seal against the wall of the wellbore 104, for example, against the interior wall of the casing 112 in the cased portions of the wellbore 104 or against the interior wall of the wellbore 104 in the uncased, open hole portions of the wellbore 104. In certain instances, the seal system 126 can form a gas and liquid tight seal at the pressure differential the system 124 creates in the well 102. In some instances, the seal system 126 of the downhole-type system 124 seals against the interior wall of the casing 112 or the open hole portion of the wellbore 104. For example, the seal system 126 can be configured to at least partially seal against an interior wall of the wellbore 104 to separate (completely or substantially) a pressure in the wellbore 104 downhole of the seal system 126 of the downhole-type system 124 from a pressure in the wellbore 104 uphole of the seal system 126 of the downhole-type system 124. Although FIG. 1 includes both the downhole-type system 124, in other instances, additional components, such as a surface compressor, can be used in conjunction with the system 124 to boost pressure in the well 102.

In some implementations, the downhole-type system 124 can be implemented to alter characteristics of a wellbore by a mechanical intervention at the source. Alternatively, or in addition to any of the other implementations described in this specification, the downhole-type system 124 can be implemented as a high flow, low pressure rotary device for gas flow in sub-atmospheric wells. Alternatively, or in addition to any of the other implementations described in this specification, the downhole-type system 124 can be implemented in a direct well-casing deployment for production through the wellbore. Other implementations of the downhole-type system 124 as a pump, compressor, or multiphase combination of these can be utilized in the well bore to effect increased well production.

The downhole-type system 124 can be used to locally alter the pressure, temperature, and/or flow rate conditions of the fluid in the wellbore 104 proximate the system 124 (e.g., at the base of the wellbore 104). In certain instances, the alteration performed by the system 124 can optimize or help in optimizing fluid flow through the wellbore 104. As described above, the downhole-type system 124 creates a pressure differential within the well 102, for example, particularly within the wellbore 104 the system 124 resides in. In some instances, a pressure at the base of the wellbore 104 is a low pressure (e.g., sub-atmospheric); so unassisted fluid flow in the wellbore can be slow or stagnant. In these and other instances, the downhole-type system 124 introduced to the wellbore 104 adjacent the perforations 114 can reduce the pressure in the wellbore 104 near the perforations 114 to induce greater fluid flow from the subterranean zone 110, increase a temperature of the fluid entering the system 124 to reduce condensation from limiting production, and increase a pressure in the wellbore 104 uphole of the system 124 to increase fluid flow to the surface 106.

The well system 100, and particularly the downhole-type system 124, can include a magnetic bearing system. A magnetic bearing system for rotor support, a magnetic thrust bearing for thrust support, a magnetic radial bearing for radial support, a high speed permanent magnet motor for torque, a sensor-less long distance variable frequency drive, magnetic bearing controls, and advanced fluid compression and pump configuration can be used to improve reliability and robustness of downhole-type equipment. In some implementations, the use of the magnetic bearing system and permanent magnet motor allow for adequate operating clearances between rotating and nonrotating parts for fluid to pass, eliminating the need for seals, barrier fluid systems or protection bag/bellow systems. Particulate material in process fluid is free to flow through the clearances. For example, particulates can be approximately 1-4 mm in size. The use of these systems can also provide operational data for the well currently unavailable, or only available with additional sensor systems. For example, the sensor-less variable frequency drive can provide data on operating temperature and fluid properties through its operating requirements. Or, another example is an active thrust bearing can provide data on operating pressure during operation and liquid/gas content in the well. The device consists of high temperature components to allow survival in high temperature environments present in deep wells. The device can utilize fully isolated rotor and stator parts to protect any materials and components that would be adversely affected by the process fluids. This provides the isolation for allowing the process fluid to flow into and through the motor and bearings.

Magnetic bearing systems can offer advantages in certain applications over conventional mechanical bearings or air bearings. Magnetic bearings do not require lubrication and can operate in a variety of environments in which typical lubricated bearings have difficulty operating (such as vacuum conditions or in the presence of sour gas). The performance of active magnetic bearings is adjustable using a controller programmed in software (within the load ratings of the actuators of the magnetic bearings), whereas mechanical bearings require a mechanical change in hardware to provide a change in performance and/or response. A control loop (maintained, for example, by a controller) operates active magnetic bearings, as the actuators of active magnetic bearings are not passively stable.

Downhole devices typically operate in harsh environments constrained by the casing diameter installed in a drilled well. The process fluids present in the well are typically caustic on materials and can degrade equipment operation over the lifetime of the well. Lubrication for mechanical bearings can be quickly lost as the process fluids flow through the downhole devices, rendering the mechanical bearings unusable. Conventional approaches, for example, employed on electrical submersible pumps, include creating a chamber of clean oil for the mechanical bearings to operate on. The chamber is kept relatively clean by a labyrinth seal, but over time, process fluids can contaminate the oil, which can result in bearing failure.

In contrast, magnetic bearings can be isolated from the downhole environment or optionally operated within the downhole environment, exposed to the process liquids, if the components are compatible. Downhole-type devices can use active magnetic bearing systems that do not require lubrication and can operate flooded in the process fluid. For sealed systems (such as a motor for an electrical submersible pump), the downhole device does not need to be flooded in liquid to operate, which can significantly reduce drag losses on the motor and therefore increase pumping efficiency. Magnetic bearings also impose minimal losses. Therefore, the use of magnetic bearing systems in downhole devices can increase the relative torque output for an equivalently sized motor, or reduce size and power requirements for the same shaft torque output. Additionally, the motor is versatile in that the motor can be operated in a barrier fluid (as is done conventionally) or can be isolated from the fluid, meaning the motor can be operated flooded, flow through, or fully sealed with magnetic coupling operation.

The well system 100 also includes a motor drive system 200 to provide power to a tool of the downhole-type system 124. The downhole-type system 124 includes a downhole-type electric motor 302 (not shown in FIG. 1, described in more detail later) with a rotor configured to rotate about a central longitudinal axis. The downhole-type system 124 also includes other downhole-type tools, including sensors, communication devices, coils, dampers, and/or other electric devices or tools that require power to operate, described in more detail later. The motor drive system 200 includes a VSD 203 electrically connected to the downhole-type electric motor 302 to provide power and control to the electric motor 302 positioned in a downhole location within the wellbore 104. The VSD 203 is shown as located at the surface 106 and electrically connected (for example, by the wireline 128) to the motor 302 of the downhole-type system 124, which is positioned in the wellbore 104. In some implementations, the VSD 203 is located within the wellbore 104, for example, close to or remote from the downhole-type system 124. The distance between the variable speed drive 203 and the downhole location of the motor 302 positioned in the wellbore 104 can vary. In some implementations, the distance between the VSD 203 and the motor 302 is at least 100 meters (m). In other words, the VSD 203 and the motor 302 positioned in the wellbore 104 can be physically located at least 100 m away from each other. The cables extending between the VSD 203 and the motor 302 are required to rotate the motor 302 so a tool connected to the motor 302 can do work. Without the concepts described herein, for other tools present in the downhole environment, separate power cables would be needed with additional connectors and feed throughs to pass through pressure barriers into the well bore and down to the respective tool. Also, without the concepts described herein, a signal sent from a power source located such a long distance away to a low-voltage downhole-type tool (e.g., communication device, sensor, damper, and/or other electric device) will suffer from losses and unreliability. This disclosure solves that problem by locally generating power in the downhole environment near or within the downhole-type system 124 to provide power to downhole-type tools and electric devices local to the downhole-type system, where the locally-generated power does not suffer losses or unreliability due to distance and/or harsh environments, and also does not require separate cables, connectors, and feed throughs to reach the other downhole-type tool(s). In some instances, the VSD 203 generates and transmits a drive signal to the motor 302 to operate the motor 302 to rotate the rotor. The motor drive system 200 also includes a power source 201, which can take a variety of forms. In some examples, the power source is an electric current source, such as a grid.

Figure 2:
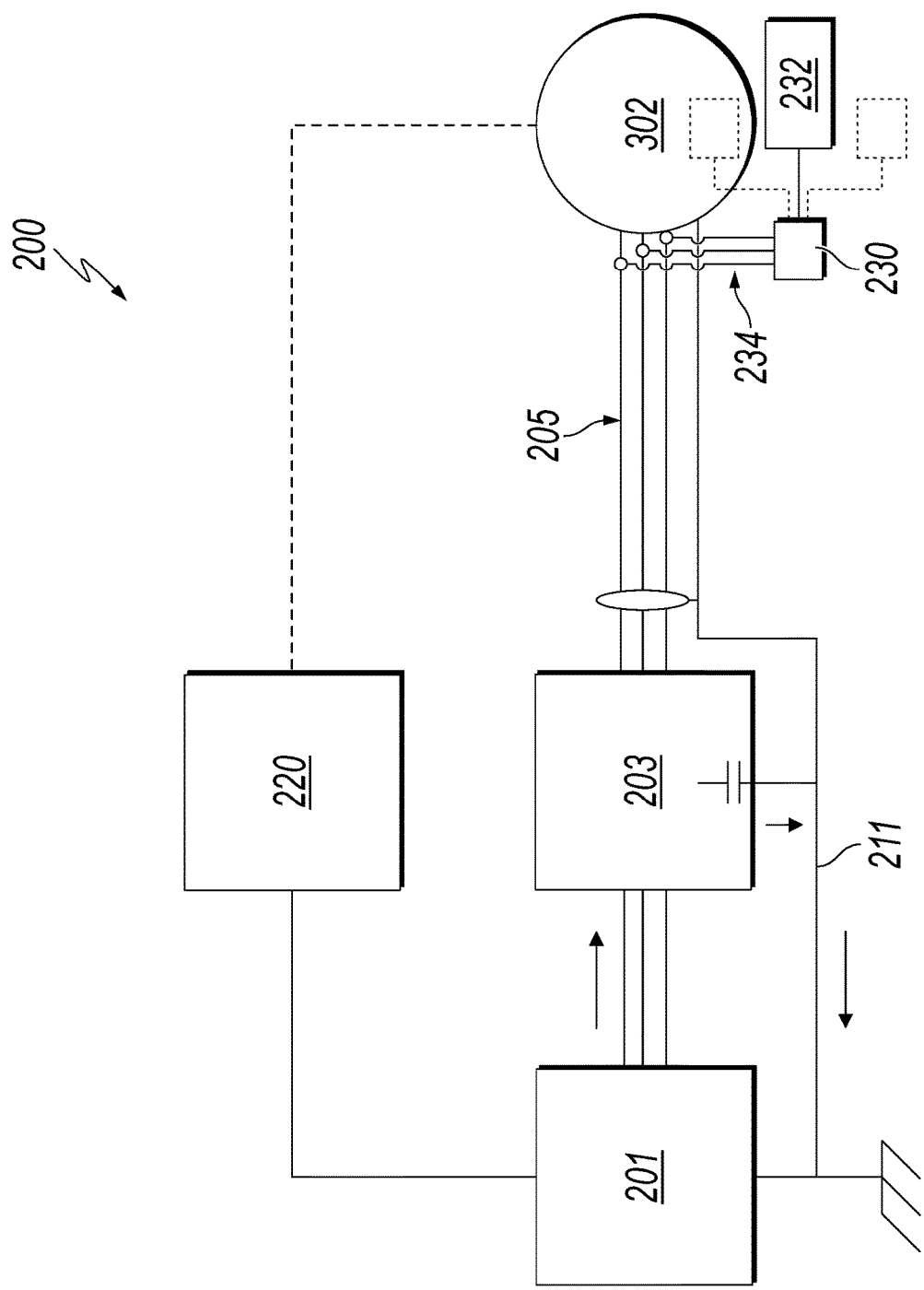
FIG. 2 is a schematic view of an example motor drive system.

FIG. 2 is a schematic view of an example of the motor drive system 200. The example motor drive system 200 includes the power source 201, VSD 203, and the electric motor 302. The components (201, 203, 302) of the motor drive system 200 are all electrically coupled to one another. The power source 201 can include an alternating current (AC) source, and a rectifier to convert the AC signal into DC to provide a direct current source to the motor drive system 200. The motor drive system 200 can include a controller 220 electrically coupled to the power source 201 and the VSD 203, and in some implementations, the motor 302. The motor drive system 200 shown in FIG. 2 employs a three-phase drive, where three-phase conductors 205 extending between the VSD 203 and the electric motor 302 can be used to supply power and control (e.g., of rotary speed) to the electric motor 302 from the VSD 203. The three-phase conductors 205 can extend to the electric motor 302 through a designated conduit, for example, via the wireline 128 of FIG. 1. A ground current 211 is also shown as connected to and extending between the motor 302, VSD 203, and power source 201.

The power source can provide a three-phase AC supply to the VSD 203. The VSD 203 can include rectifiers, filters, and inverters, and/or other electrical structures required to transmit a three-phase alternating current (AC) signal to the electric motor 302, where the three-phase AC signal supplies both power and control to the electric motor 302. In some implementations, the VSD 203 can be a low voltage VSD (e.g., less than 600 volts). The VSD 203 can generate and transmit a drive signal to supply power to the motor 302. The drive signal can be sufficient to power the motor 302 to operate at various rotary speeds, for example, at speeds of at least 6,000 rpm. The drive signal can include a pulse width modulated sinusoidal waveform, and the VSD 203 can switch at frequencies at a rate that is sufficient to generate the drive signal to power to motor 302 to operate at the various rotary speeds. For example, the VSD 203 can produce a high frequency drive signal of 1,000 hertz (Hz) for a 60,000 rpm two pole motor or (as another example) 2,000 Hz for a 60,000 rpm four-pole motor. With pulse width modulation, the average value of voltage (and current) to a load is controlled by turning a switch between supply and load, on and off at a fast rate. The longer the switch is on compared to the off periods, the higher the total power supplied to the load. The power loss in the switching device (i.e., the VSD 203) implementing the pulse width modulation can be very low. When the switch is off, there is practically no current, and when the switch is on (and power is being transferred to the load), there is almost no voltage drop across the switch. Power loss (which is the product of voltage drop and current), is therefore (in both cases) close to zero. To produce the high frequency drive, sinusoidal waveform using insulated gate bipolar transistors can switch at frequencies five to ten times faster than the waveform being produced in order to generate a clean waveform and reduce switching harmonics (which cause losses in the system). The VSD 203 can drive the motor 302 across long distances (for example, longer than 100 m) and can operate without sensors, meaning sensor signal transmissions are not required.

The motor drive system 200 also includes a rectifier 230 electrically connected to the three-phase conductors 205 proximate to the electric motor 302. The rectifier 230 directs at least a portion of the power from the three-phase conductors 205 to one or more downhole-type tools 232 in a downhole environment, for example, proximate to or integral with the electric motor 302. FIG. 2 shows one downhole-type tool 232 and two optional secondary downhole-type tools in dashed lines; however, the number and location of the one or more downhole-type tools can vary. The rectifier 230, the downhole-type tools (e.g., downhole-type tool 232), or both can be positioned close to or integral with the electric motor 302, such as within a housing of the electric motor 302, attached to or integral with another tool connected to the electric motor 302, or otherwise positioned close to (e.g., within 100 feet of) the electric motor 302. The rectifier 230 can connect to the three-phase conductors 205 at any position along the length of the three-phase conductors 205, for example, at a position close to (e.g., within 100 ft, 50 ft, 1 ft, 6 inches, or other) the electric motor 302. While FIG. 2 shows the rectifier 230 as connected to each conductor of the three-phase conductors 205 with a secondary conductor 234, the rectifier 230 can connect to any number of the conductors (e.g., just one conductor, just two conductors, or all three conductors) of the three-phase conductors 205 to tap into the power supply. In some implementations, the rectifier 230 connects to one or more terminals of the electric motor 302, where the motor terminals are the locations on the electric motor 302 where the one or more conductors of the three-phase conductors 205 connects to the electric motor 302.

The downhole-type tool 232 can take a variety of forms. For example, the downhole-type tool 232 can include a sensor, magnetic bearing, generator, communication device, damper, electromagnetic coil, control electronics, a combination of these, or any other device requiring power. The rectifier 230 diverts sufficient power from the three-phase conductors 205 to power the one or more downhole-type tools it is electrically connected to. The VSD 203 supplies power based on the total load on the three-phase conductors 205, so the diverted portion of power to the rectifier 230 from the three-phase conductors 205 does not impact an operation of the electric motor 302. While FIG. 2 shows rectifier 230 as connected to multiple downhole-type tools 232, the system 200 can include multiple rectifiers, for example, a rectifier for each downhole-type tool requiring power.

During operation of the electric motor 302, the VSD 203 supplies power to and controls a speed and operation of the electric motor 302 by AC signal via the three-phase conductors 205. In some implementations, the electric motor 302 can operate (e.g., rotate the rotor) without power supply or control from the VSD 203. For example, the rotor of the electric motor 302 can be driven by another tool connected to the rotor, such as an impeller or fan that is driven by fluid movement in a downhole wellbore to rotate the rotor, or the rotor can rotate with rotational momentum when the VSD 203 discontinues providing an AC signal to the motor 302 over the three-phase conductors 205. The electric motor 302 can supply a back electromotive force or back electromagnetic field (BEMF) to the three-phase conductors 205, and the rectifier 230 can pull power from the three-phase conductors 205 while the electric motor 302 supplies the BEMF to the conductors 205, to provide an input to the one or more downhole-type tools 232.

In some implementations, the rectifier 230 includes a voltage regulator to smooth an output voltage of the diverted portion of the power supply (i.e., from the three-phase conductors 205). The voltage regulator can smooth the output voltage to a form that is usable by the one or more downhole-type tools 232. The voltage regulator can take many forms. In some instances, the voltage regulator is a buck-boost converter that provides an output of a constant voltage. For example, the buck-boost converter can convert an input voltage signal received at the rectifier 230 to a constant voltage output, where the contact voltage output can be supplied to the at least one downhole-type tool 232 to operate the downhole-type tool 232. In some examples, the voltage regulator can include a buck-boost converter, a boost chopper, a buck converter, and/or another type of voltage regulator or converter.

In some instances, the downhole-type tool 232 requires a low voltage input to operate. A low voltage input can vary. In some examples, a low voltage input can be 5 volts direct current (vdc), 12 vdc, 15 vdc, 24 vdc, 48 vdc, or another vdc. During operation of the electric motor 302, the three-phase conductors may supply a low voltage (e.g., for low motor speed) or high voltage (e.g., for high motor speed) based on a speed and operation of the motor 302. The voltage regulator operates to provide a desired output voltage to the downhole-type tools 232 at any voltage supply inputs from the VSD 203 to the motor 302. For example, for a first lower range of voltage supply inputs for a lower speed of the motor 302 (e.g., up to 3,000 revolutions per minute, or rpm), the voltage regulator can provide the voltage output to the downhole-type tools at a desired voltage. At higher speeds of the motor 302 (e.g., greater than 3,000 rpm), the voltage regulator can reduce the voltage supply input at the rectifier 230 and hold a voltage output at the desired voltage, continuing to supply the desired voltage to the downhole-type tools 232. In examples where the voltage supply input is below the desired voltage (e.g., at motor speeds of 1,000 rpm or less), the voltage regulator can boost voltage output to the desired voltage.

While FIG. 2 illustrates the VSD 203 as connected to the downhole-type electric motor 302, the concepts described herein are applicable to implementations outside of a wellbore. For example, a VSD can connect to an electric motor positioned a significant distance (e.g., 100 meters or greater) away from each other. The VSD can provide power and control to the electric motor or other power unit including a rotor, and a rectifier (like rectifier 230) can divert and supply power to other electric devices locally proximate to the electric motor or other power unit. In other words, while the concepts described later relate to downhole-type systems and downhole-type motors and tools, the concepts herein are applicable to other implementations including a VSD supplying power and control to a power unit, where a rectifier, generator, or other structure pulls power from the power intended for the power unit for other electronic devices local to the power unit.

Figure 3:
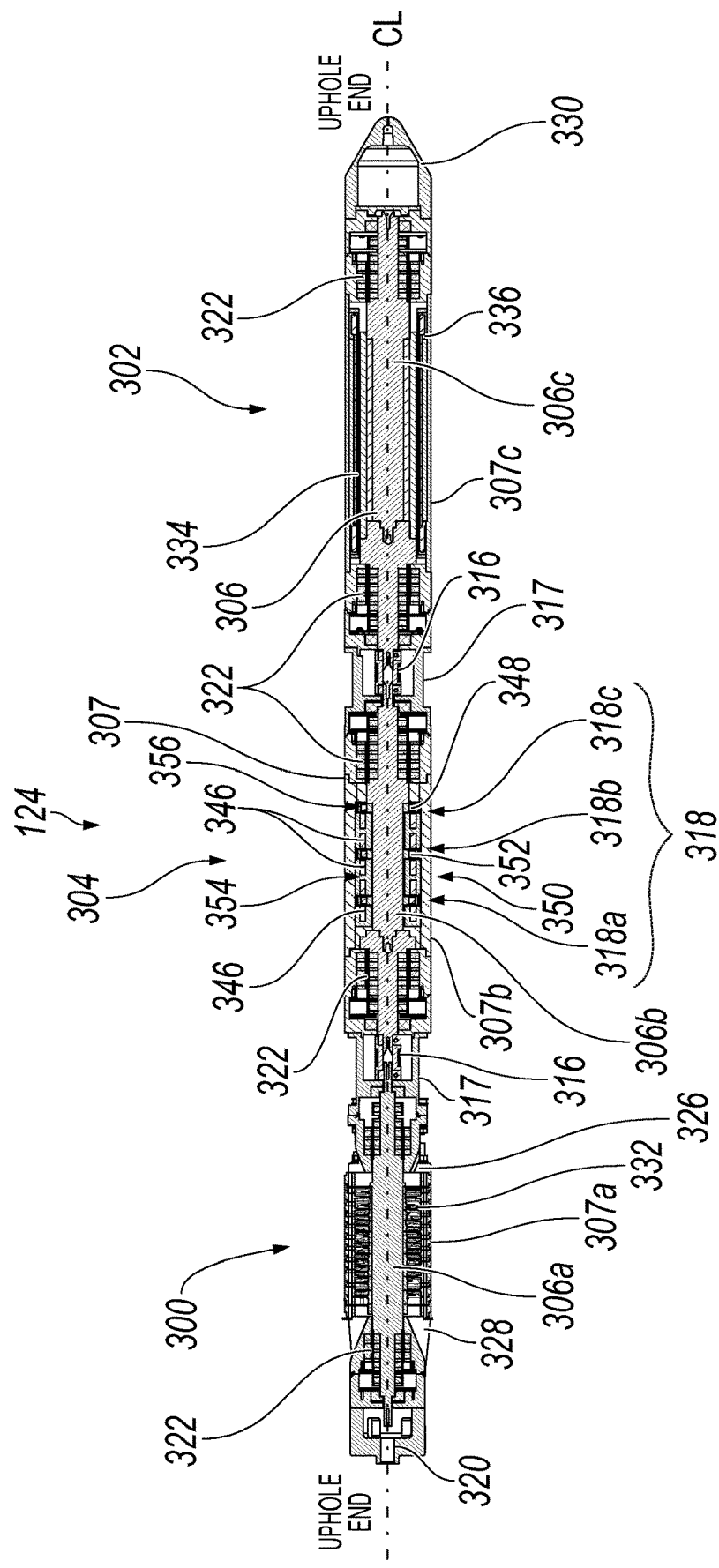
FIG. 3 is a schematic side half cross-sectional view of an example downhole-type system.

FIG. 3 is a half side cross-sectional view of the example downhole-type system 124 from FIG. 1. Referring to FIGS. 1, 2, and 3, the example downhole-type system 124 includes a blower 300, a thrust bearing module 304, and the motor 302 (the motor 302 is part of the motor drive system 200 of FIG. 2 and also a part of the downhole-type system 124). The electric motor 302, the thrust bearing module 304, and the blower 300 are all coupled together on a central shaft or rotor 306, but the central rotor 306 can instead be segmented, for example, separated into multiple rotor sections joined at longitudinal ends of each section with a coupling or other structure, described later. The downhole-type system 124 can include in addition to or instead of the blower 300 another type of rotating equipment, such as a pump (e.g. an electrical submersible pump), fan, or other rotating equipment. While FIG. 3 shows the example downhole-type system 124 as including the motor 302, blower 300, and thrust bearing module 304, the example downhole-type system 124 can include the motor 302 and different or additional equipment and devices connected to the motor 302, for example, to perform other operations in a downhole environment of a wellbore.

In the context of this disclosure, an uphole end or direction is an end nearer or moving in a direction towards the surface 106. A downhole end or direction is an end nearer of moving in a direction away from the surface 106. A coupling 320 is positioned at an uphole end of the blower 300. The coupling can be of a type used for a wireline connection, a tubing connection, or any other connection configured to support the weight of the downhole-type system. The coupling 320 can include a standard attachment method to attach the blower 300 to a support system. For example, a threaded interface can be used for a sucker rod, or a set of bolts can be used to attach two flanges together for production tubing.

In the example downhole-type system 124 of FIG. 3, the electric motor 302 is positioned downhole of the blower 300, and the thrust bearing module 304 resides between the electric motor 302 and the blower 300. In some instances, the blower 300, the thrust bearing module 304, and the electric motor 302 can be assembled in a different order. For example, the thrust bearing module 304 can be positioned downhole of the electric motor 302 or uphole of the blower 300.

In FIG. 3, the central rotor 306 is made up of multiple sub-sections coupled together: a blower rotor 306a, a thrust bearing rotor 306b, and an electric rotor 306c. Each sub-section is joined together by a coupling 316. The coupling 316 can be a bellows, quill, diaphragm, or other coupling type that provides axial stiffness and radial compliance. In certain instances, the coupling 316 can allow for angular misalignment (e.g., misalignment of 0.30-2.0 degrees), and a lateral misalignment (e.g., misalignment of 0.01 inches). Variation in thermal growth can be designed to be accepted in the compressor and motor clearances, though the coupling 316 can tolerate some degree of axial misalignment (e.g., axial misalignment of about 0.03 inches). Larger and smaller alignment tolerances can be achieved with different coupling configurations and sizes, specific to the application needs. In some implementations, the central rotor 306 can include a single, unitary shaft that runs through the blower 300, the thrust bearing module 304, and the electric motor 302. In the same way, the blower 300, the thrust bearing module 304, and the motor 302 can each be housed in a combined outer casing 307, or each can have their own outer casings: a blower casing 307a, a bearing module casing 307b, and a motor casing 307c, respectively.

The blower 300 directs fluid flow through the blower 300, or is driven by fluid flowing through the blower 300 based on a pressure differential across the blower 300. The electric motor 302 is configured to rotatably drive the blower 300 or be driven to generate electricity by the blower 300. The central rotor 306 is levitated and axially supported by one or more active magnetic thrust bearing assemblies 318 located in the thrust bearing module 304. One or more passive magnetic radial bearing assemblies 322 radially levitate and support the central rotor 306. While one of each electric motor 302, thrust bearing module 304, and blower 300 modules are shown, more than one of each or all are practical in this configuration, thus allowing for additional motor power, additional thrust load support, and additional flow or pressure capacity to be added independently of each other to best produce the specific well performance. In addition, while the order of the electric motor 302, thrust bearing module 304, and blower 300 from downhole to uphole is shown, each module functions independently and can be placed in other orders that best suit the operation and integration of each module. Additionally, while blower 300 is shown, this module can include a blower, a compressor, a liquid pump, a multiphase pump, an electric submersible pump (as described earlier), or a combination thereof that best suits the fluids and conditions of the well to maximize well performance. In addition, the use of passive magnetic radial bearing assemblies 322 and active magnetic thrust bearing assemblies 318 can be seen as one example of such an implementation of magnetic bearings, where active radial bearings and/or passive thrust bearings can be used instead of or in addition to, in any case to enhance the downhole system performance.

In some implementations, the blower 300 includes an inlet 326 to receive a fluid (e.g., gas) at the first pressure downhole of the blower 300 and an outlet 328 to output the fluid at the second, higher pressure uphole of the blower 300. The inlet 326 can include a filter to limit particle sizes above a certain threshold from entering the downhole-type system 124. A cylindrical outer housing 307a houses an impeller 332 in fluid communication with the inlet 326 to receive the fluid from the wellbore 104 at the first pressure downhole of the blower 300 and to drive the fluid to the outlet 328 at the second, higher pressure uphole of the blower 300. The impeller 332 is attached to or integrated with the blower rotor section 306a of the central rotor 306, and configured to rotate with the central rotor 306, for example, to drive or be driven by the central rotor 306. In the illustrated implementation, the blower 300 is coupled to an uphole end of the thrust bearing module 304 by the coupling 316 and a coupling housing 317.

With the system 124 residing in the wellbore 104, the inlet 326 is at a downhole end of the blower 300 and the outlet 328 is at an uphole end of the blower 300. At a downhole end of the system 124 is a conical tip 330. The conical tip 330 can reduce a pressure drop across the system 124. In some implementations, the conical tip 330 can house electronics that can be used in aspects of operation of the system 124, or for sensors or communication devices. In some instances, the system 124 can be positioned in the well with the downhole inlet 326 positioned adjacent to perforations 114 in the wellbore 104. For example, the blower 300 can be positioned in the wellbore 104 such that the inlet 326 is disposed next to and immediately uphole of perforations in the wellbore 104 to maximize or improve the fluid flow from the perforations into the blower 300. In some examples, the inlet 326 may not be adjacent to perforations, such as the inlet 326 being positioned greater than about twenty feet away from perforations. In some instances, a speed of the blower 300 is adjusted based on the fluid flow from the subterranean zone into the wellbore 104 (e.g., via perforations). For example, as the fluid flow from the subterranean zone into the wellbore 104 decreases, a speed of the blower 300 can increase to draw more fluid flow from the subterranean zone into the wellbore 104.

As previously described, the downhole-type system 124 moves the fluid from the downhole inlet 326 at the first pressure to the uphole outlet 328 at the second, higher pressure. This pressure differential promotes the fluid flow to move uphole of the system 124, for example, at a higher flow rate compared to a flow rate in a wellbore without a blower. The blower 300 can operate at a variety of speeds, for example, where operating at higher speeds increases fluid flow, and operating a lower speeds reduces fluid flow. In some instances, the impeller of the blower 300 can operate at speeds up to 120,000 rpm. In some instances, the impeller of the blower 300 can be run at lower speeds (e.g., 40,000 rpm, or other).

The magnetic thrust bearing assembly 318 and the magnetic radial bearing assembly 322 can fully support the central rotor 306 with one or more electromagnetic fields. That is, the central rotor 306 is not physically coupled to the outer housing 307 during normal operation; there is no physical connection between the central shaft 306 and the outer housing 307. In other words, the shaft is spaced apart from the housing 307 and any associated mechanism connected to the housing 307 with a radial gap between the central shaft 306 and the housing 307.

In some implementations, an active damping circuit can be included. The active damping circuit uses a coil to sense rotor radial motion and provide a current in size and frequency relative to this motion to a control board. The control board amplifies this signal and adjusts the relative polarity/ phase to feed it back to a damping coil that reacts against the rotor field to resist the motion, thus damping out the motion. No radial position sensors or controller is required for operation. The active damping circuit is able to adjust the magnetic field sufficiently enough to reduce vibration, but does not have the power to significantly affect the lifting or support characteristics of the bearing. In some implementations, the active damping circuit acts as a generator that generates power when the axial gap decreases and thus powers a control coil to increase the levitating force. Thus, it doesn't need a sensor or an outside power source/controller. This approach can also be used for the axial axis, where a sense coil output sensing axial motion is amplified and fed to a damping to coil to react against the rotor field to resist motion.

In some instances, position sensors are required for an active magnetic bearing, such as for the thrust bearings 318, and can use conventional inductive, eddy current, axial gap generator, or other types of sensors. These sensors can be isolated from the wellbore environment, or in some implementations be exposed to the wellbore environment depending on the construction of the thrust bearing module 304. Position sensors can be located within the thrust bearing module 304, within the blower 300, or in any other location along the rotor 306, for example, a location intended to be a central point of axial position control.

The position sensors can include a position-sensitive generator, such as an axial gap generator, that can produce a voltage signal as the rotor 306 rotates proportional to, or as a function of, the axial gap between the axial gap generator and the rotor 306 to determine axial position of the central rotor 306. This offers a high voltage output that can be transmitted over long distances to minimize line drop and noise issues. For example, axial gap generators or other generators and sensors can tap into a communication line or another line extending to the VSD 203 to provide its voltage output to a tophole device that interprets the voltage output into a usable measurement, such as an axial position measurement.

The thrust bearing module 304 compensates for axial loads and holds, or re-centers, the axial position of the rotor 306 by applying force to the rotor 306 to maintain position or force the rotor 306 to a center, or neutral, position. For example, as loads are developed on the rotor 306 from the act of compressing or pumping fluids, a thrust bearing controller senses position movement of the rotor 306 from a target set point. The controller can then increase the current to control coils 346 of the thrust bearing assembly 318, where the current is converted to an axial force on the rotor 306. This force can be determined based at least in part on the amount of displacement sensed and the rate of change in motion using a control approach set by the controller. The thrust bearing 318 is thus able to compensate for forces on the rotor 306 and apply corresponding off-setting axial forces to keep the rotor in an axially centered position. While a permanent magnet on the rotor configuration is shown, various configuration of thrust bearing could be applied, including all electric or alternative permanent magnet configurations.

As illustrated in FIG. 3, the thrust bearing module 304 allows for non-magnetic spacers 348 to be used at the rotor outer diameter for setting stator axial position and for locking the split stator assemblies 350 of the thrust bearing assembly 318. Opposite polarity permanent magnets 352 are used on the rotor 306b to allow for coil wrapping of one or more back-to-back stator "C" shaped cores 346 to reduce overall bearing size and make assembly possible in split stator halves (i.e. both use the same coil). The outer housing 307b, limited by the well installation casing size and flow path requirements, limits thrust bearing outer diameter, where the rotor outer diameter is further limited by the stator spacer and adequate clearance for rotor radial motion during operation and transport, and radial rotor growth due to high speed operation. In the illustrated implementation, the stator poles 354 of the thrust bearing assembly 318 are radially offset from the rotor poles 356 on the rotor 306. With the restricted rotor outer diameter limiting the rotor pole size, the stator pole offset increases the cross section of the stator poles 354, which increases the capacity of the thrust bearing 318, increasing bearing capacity without increasing overall bearing size.

The illustrated implementation of the thrust bearing module 304 shows a three bearing module 318 with a first thrust bearing 318a, a second thrust bearing 318b, and a third thrust bearing 318c. The stator pole on the third thrust bearing 318c is missing in the arrangement shown, where this is to be the downhole side of the module. Since the thrust load is generally in a downhole direction as the system pushes fluid uphole, this arrangement of leaving the bottom stator pole provides a passive force in the uphole direction. That is, with no current, the module will lift the rotor 306b (and anything coupled to the rotor 306b) in an uphole direction. Further lift can be imparted on the rotor with coil current in one direction, and lift can be reduced with coil current in the opposite direction. The number of thrust bearings in a module can be one or more, depending on size, integration, rotodynamics, and other design considerations.

FIG. 3 shows the electric motor 302 as coupled to a downhole end of the thrust bearing module 304. The electric motor 302 is configured to either drive the central rotor 306 or be driven by the central rotor 306 to generate electricity. In some implementations, the motor rotor section 306c includes a permanent magnet rotor that is axially levitated and supported by the thrust bearing module 304. The permanent magnet rotor 306c is coupled to the thrust bearing rotor 306b by a coupling 316. An electric stator 334 surrounds the permanent magnetic rotor 306c. The electric stator 334 includes electric coils 336. In some implementations, a passive magnetic radial bearing structure 322 can support and levitate the permanent magnet rotor 306c to the electric stator 334. As the permanent magnet rotor 306c is axially supported by the thrust bearing module 304, no thrust bearing is needed within the electric motor 302. The stator 334 can be canned using a metallic or non-metallic sleeve on the inner diameter of the stator 334. The can is sealed, by welding for example, at each end and supported from any well pressure by the stator and/or potting behind the sleeve to insure it does not deform during operation. Multiple electric motors 302 can be connected in series to produce more power to drive the central rotor 306, if needed.

Downhole devices, such as the downhole-type system 124, typically operate in harsh environments constrained by the casing diameter installed in a drilled well. Process fluids present in the well are typically caustic on materials and can degrade equipment operation over the lifetime of the well. Lubrication for mechanical bearings can be quickly lost as the process fluids flow through the downhole devices, rendering the mechanical bearings unusable. Conventional approaches, for example, employed on electrical submersible pumps, include creating a chamber of clean oil for the mechanical bearings to operate on. The chamber is kept relatively clean by a labyrinth seal, but over time, process fluids can contaminate the oil, which can result in bearing failure.

In contrast, magnetic bearings can be isolated from the downhole environment or optionally operated within the downhole environment, exposed to the process liquids, if the components are compatible. Downhole-type, such as the blower 300, thrust bearing module 304, and/or electric motor 302 of the downhole-type system 124, can use magnetic bearing systems (e.g., active or passive) that do not require lubrication and can operate flooded in the process fluid. For sealed systems (e.g., a motor for an electrical submersible pump), a downhole device does not need to be flooded in liquid to operate, which can significantly reduce drag losses on the motor and therefore increase pumping efficiency. Magnetic bearings also impose minimal losses. Therefore, the use of magnetic bearing systems in downhole devices can increase the relative torque output for an equivalently sized motor, or reduce size and power requirements for the same shaft torque output. Additionally, the motor is versatile in that the motor can be operated in a barrier fluid (as is done conventionally) or can be isolated from the fluid, meaning the motor can be operated flooded, flow through, or fully sealed with magnetic coupling operation.

In some implementations, the electric motor 302 can utilize fully isolated rotor and stator parts to protect any materials and components that would be adversely affected by process fluids in the wellbore. This provides the isolation for allowing process fluids or other environmental fluids to flow into and through the motor 302 and its bearing elements. In certain implementations, to protect any electrical components or other components in the electric motor 302, the components can be "canned" or otherwise isolated from the wetting fluid (e.g., fluid within the motor 302). That is, an insulation barrier, isolation barrier, or shield can be positioned at least along an inner circumference of the stator 334 of the motor 302. The stator 334 can include sealing elements to isolate the stator 334 from an outside environment. The stator sealing elements act as a shield to protect and isolate the coils and/or stator windings of the stator 334 from the environment. The stator sealing elements can be welded or otherwise attached to the stator 334 to prevent process fluids or other fluids from contacting the coils or windings and affecting performance of the motor 302. The sealing elements can be metallic and non-magnetic, but can also be made of a non-metallic material, such as polyether ether ketone (PEEK) or ceramic.

As described earlier, the electric motor 302 is controlled by the VSD 203 (e.g., a high frequency VSD) at the surface of the well. Variable frequency or speed allows the electric motor 302 to rotate the rotor 306 at a speed optimal for well production. The VSD 203 also allows for an electric machine drive to be used at many well sites where performance in speed and power vary. While sensored drives could be used, bringing sensor signals to the surface over long distances presents many challenges, including cables and connectors in addition to having the actual sensor and their associated electronics installed in the system. The VSD 203 can be a sensor-less VSD capable of long distance (>300 meters) to control the electric motor 302. This sensor-less VSD 203 monitors the speed of the electric motor 302 and is able to maintain speed or torque control of the electric motor 302 to ensure it operates as desired. The VSD 203 is also capable of interpreting the machine parameters and/or voltage output signals (e.g., from downhole axial gap generators) to provide operating data on motor temperature and fluid properties, such as density, for example.

Cables (e.g., the three-phase conductors 205 of FIG. 2) connect the topside VSD 203 to the downhole electric motor 302, transmitting low voltage (e.g., <600 VAC), medium voltage (e.g., <10,000 VAC), and/or higher voltage from the VSD 203 to the electric motor 302. For longer distances, higher voltage is desired to reduce current losses in the cable and reduce cable size. Reductions in cable size reduce cable cost and cable weight, though may require higher class of electrical insulation on the cable. The rectifier 230 of FIG. 2 can tap into the three-phase conductors 205 and supply power to one or more of the downhole-type tools described earlier with respect to FIG. 3. For example, the rectifier 230 (or more than one rectifier) can pull power from the cables extending from the topside VSD 203 and divert that power to the position sensors, electromagnetic coils, axial gap generators, damping coils, communication devices, controllers, bearings, and/or any other electronic devices or tools locally downhole that require power to operate.

In some instances, a downhole-type system such as the downhole-type system 124 of FIGS. 1-3 includes a generator structure that locally generates power in a downhole environment to provide power to a downhole-type tool. For example, a generator structure incorporated into a downhole-type system with a downhole power unit (e.g., electric motor) can generate power from rotation of a rotor of the downhole power unit. Referring to the example motor 302 of the example downhole-type system 124 of FIGS. 1-3, a generator can be incorporated into the electric motor 302 to generate power downhole. This local power generator can supplement or replace the power diversion from the three-phase conductors 205 providing power from the VSD 203 to the motor 302.

Figure 4A:
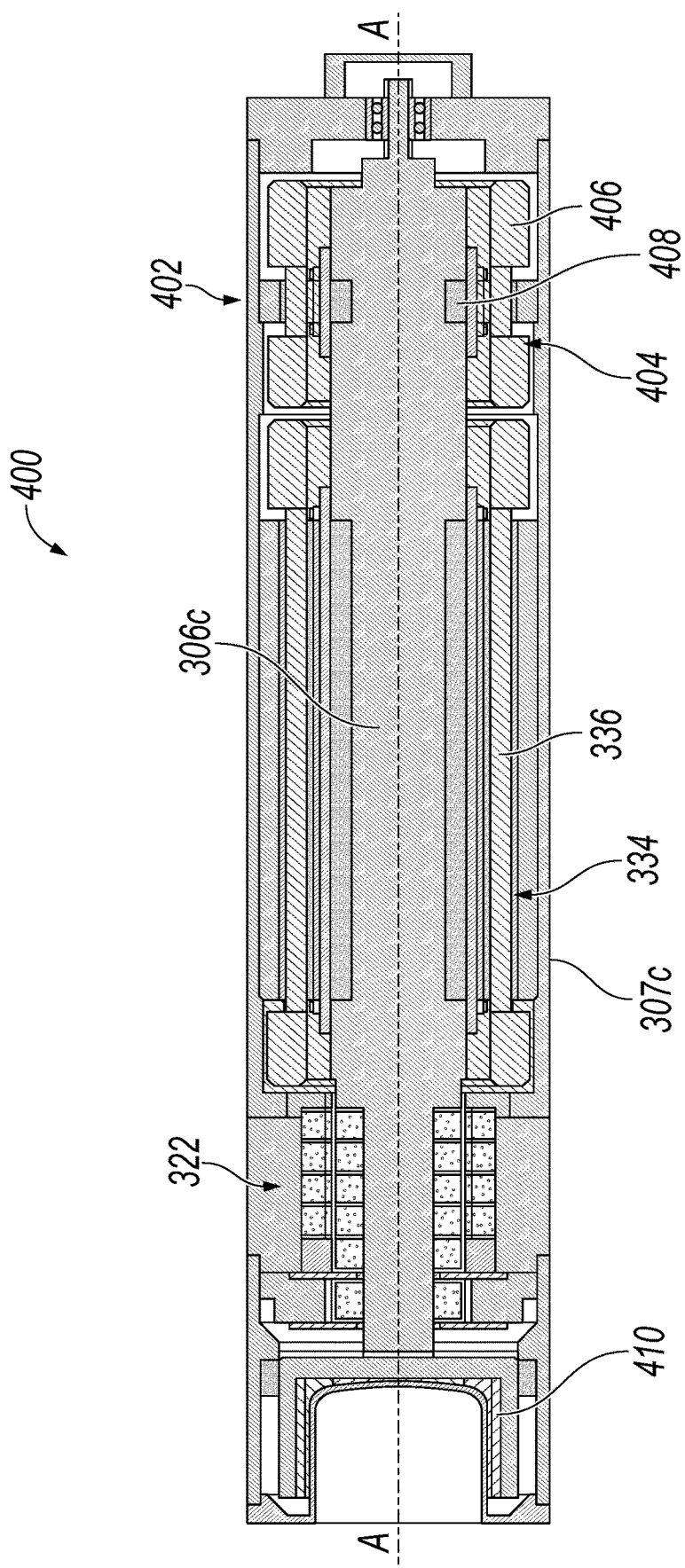
FIGS. 4A and 4B are schematic side half cross-sectional views of example electric motors.

For example, FIG. 4A is a schematic side half cross-sectional view of an example electric motor 400. The example electric motor 400 is similar to and can be used in the electric motor 302 of FIGS. 2-3, except the example electric motor 400 includes a generator assembly 402. The motor rotor section 306c includes a permanent magnet rotor that is axially levitated and supported, for example, by a thrust bearing (e.g., thrust bearing module 304). The electric stator 334 surrounds the permanent magnetic rotor 306c along a first length of the permanent magnet rotor 306c, and includes the electric coils 336. The generator assembly 402 includes a generator stator 404 that surrounds a second length of the permanent magnet rotor 306c (e.g., a substantial remaining length of the rotor 306c), and includes generator coils 406. In the example electric motor 400 of FIG. 4A, the second length of the permanent magnet rotor 306c includes one or more permanent magnets 408 (one shown, though other types of generators are possible, such as induction type) (e.g., separate from or integral with the permanent magnet of the first length). As the electric coils 336 of the electric stator 334 are energized (e.g., from the VSD 203), the electric stator 334 drives the motor rotor 306c to rotate. As the motor rotor 306c rotates, the generator coils 406 generate current and the generator assembly 402 can act as a local downhole power generator. The generator assembly 402, and particularly the generator coils 406, can connect to one or more downhole-type tools, such as the downhole-type tools 232 described earlier. In some implementations, the generator assembly 402 connects to one or more rectifiers (such as the rectifier 230 described earlier) and/or voltage regulators (e.g., boost chopper, buck-boost converter, buck converter, and/or other) to provide a controlled form of power (e.g., constant voltage output) to the one or more downhole-type tools.

In some implementations, a barrier (not shown) separates the coils of the generator stator assembly and the coils of the electric stator 334 of the motor 400 that drives the motor rotor 306c. The barrier can include a disc-shaped structure that physically separates the generator stator assembly 404 and the electric stator 334. The barrier can act as an electrical insulator between the coils of the generator stator assembly 404 and the coils of the electric stator 334, for example, to isolate electrical operation of the generator stator assembly 404 and the electric stator 334 and/or to prevent or reduce electric interference between the generator stator 404 and the electric stator 334.

In some implementations, electrical components in the motor 302, such as electric stator 334 and the generator stator 404 and their respective electrical coils 336 and 406 shown in FIG. 4A, are fluidically isolated from the outside environment surrounding the motor 302. As described earlier, the motor 302 can operate under flooded, flow through, or fully sealed conditions. The electric stator 334, generator stator 404, generator rotor, and/or electric rotor 306c can be isolated using an insulation barrier, isolation barrier, or shield, described earlier, to isolate the components from the environment (e.g., fluid in the motor 302 from the wellbore or elsewhere). Such isolation protects the electrical components from corrosion and other degradation mechanisms that can occur due to exposure to the downhole environment. In some implementations, the electric motor 302 and generator assembly 402 are isolated from the environment via an isolation barrier, where no components of the electric motor 302 or generator assembly 402 are exposed to the downhole environment. In some instances, the isolation barrier completely or substantially seals the electric motor 302 and/or the generator assembly 402 from the well environment (e.g., downhole environment). In some implementations, as shown in FIG. 4A, the rotor 306c can include a magnetic coupling 410 to transfer torque between the rotor 306c and another rotating element. For example, the magnetic coupling 410 can transfer torque of the rotor 306c within the isolation barrier to another rotating element (not shown), such as the rotor of an attached or adjacent device. For example, the magnetic coupling 410 can couple the rotor 306c with another rotor to transfer torque/rotation from the rotor 306c to the other rotor and/or transfer torque/rotation to the rotor 306c from the other rotor. FIG. 4A shows a radial-type magnetic coupling 410, but other coupling types can be used. For example, the coupling can be an axial-type magnetic coupling to transfer torque and rotation from the rotor 306c to another rotating element. While FIG. 4A shows a canned assembly 400, the assembly 400 can be wetted with process fluid or other fluid of the surrounding environment.

FIG. 4A shows the motor rotor 306c as a single, unitary rotor that extends within the electric stator 334 and the generator stator assembly 404. In some implementations, the motor rotor 306c can be segmented such that the first length of the rotor 306c is a motor rotor designated for the electric stator 334, and the second length of the rotor 306c is a generator rotor designated for the generator stator assembly 404. The motor rotor and the generator rotor can be mechanically coupled to each other with a coupling, for example, such that the rotation of the motor rotor is the same (substantially or exactly) as the rotation of the generator rotor. In some examples, the generator assembly 402 includes a separate generator housing and separate generator rotor, where the generator housing connects to the motor housing or another static support structure in the downhole environment, and the generator rotor mechanically couples, directly or indirectly, to the motor rotor to rotate with the motor rotor.

FIG. 4A shows the generator assembly 402 as a radial generator, for example, surrounding the rotor extending along a longitudinal centerline axis. In some implementations, the generator assembly 402 includes an axial generator, such as an axial gap generator, that provides an output power to the at least one downhole-type tools.

Figure 4B:
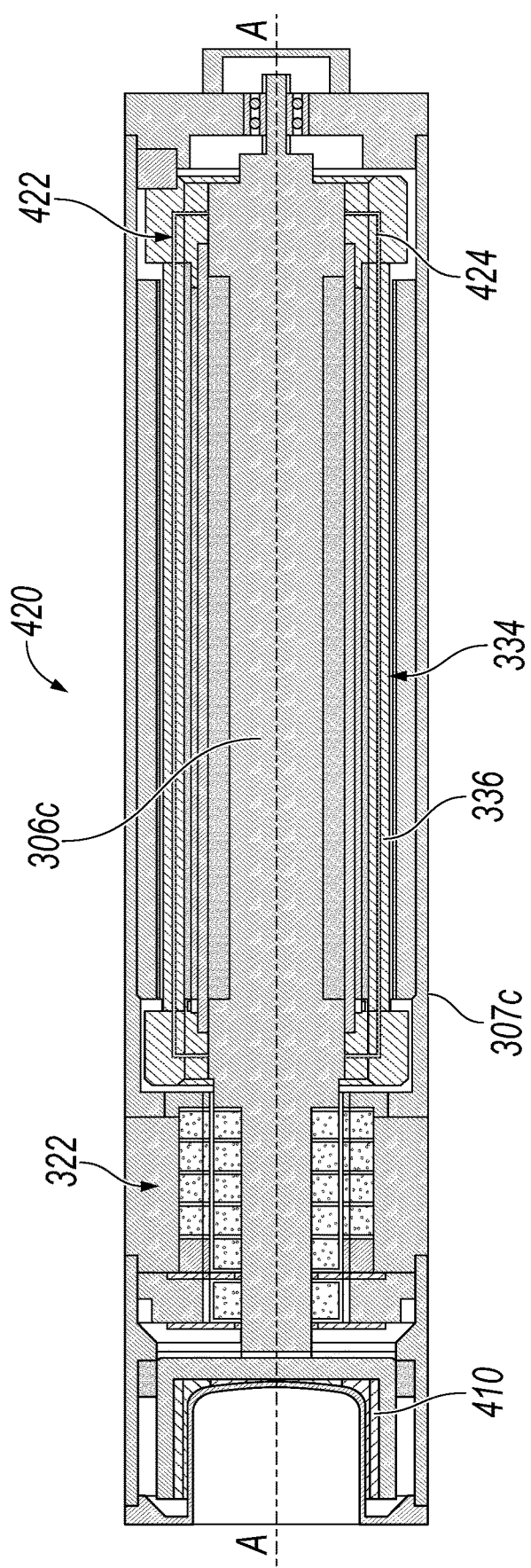

In the example electric motor 400 of FIG. 4A, the electric stator 334 and the generator stator 404 share a common rotor, but are positioned surrounding different length sections of the same rotor. In some instances, a generator assembly can be integral to the electric stator to pull power from the electric motor. For example, FIG. 4B is a schematic side half cross-sectional view of an example electric motor 420. The example electric motor 420 is similar to the example electric motor 400 of FIG. 4A, except the example electric motor 420 excludes the isolated generator assembly 402 and includes an integral generator 422 in the electric stator 334. The integral generator 422 can include a separate winding 424 in the set of stator windings of the electric stator 334, where the separate winding 424 is brought out of the electric stator 334 separately, and is used for taking power from the power supply to the electric stator 334. The separate winding 424 can be located in the same slots as the stator windings for the electric stator 334 that drives the motor rotor 306c, or can be located in separate slots in the electric stator 334 designated for only the separate winding 424 of the integral generator 422. For example, the electric stator 334 can include a three phase winding for the motor and a three phase winding for the integral generator 422, where the turns for each winding can depend on operating requirements of the motor 420, generator 422, or both. However, the number of windings for the generator assembly 422, the electric stator 334, or both, can be vary.

The separate winding 424 of the integral generator 422 can connect to one or more downhole-type tools, such as the downhole-type tools 232 described earlier. Similar to the separate generator assembly 402 of FIG. 4A, in some implementations, the integral generator 422 of FIG. 4B connects to one or more rectifiers (such as the rectifier 230 described earlier) and/or voltage regulators (e.g., boost chopper, buck-boost converter, buck converter, and/or other) to provide a controlled form of power (e.g., constant voltage output) to the one or more downhole-type tools.

Figure 5:
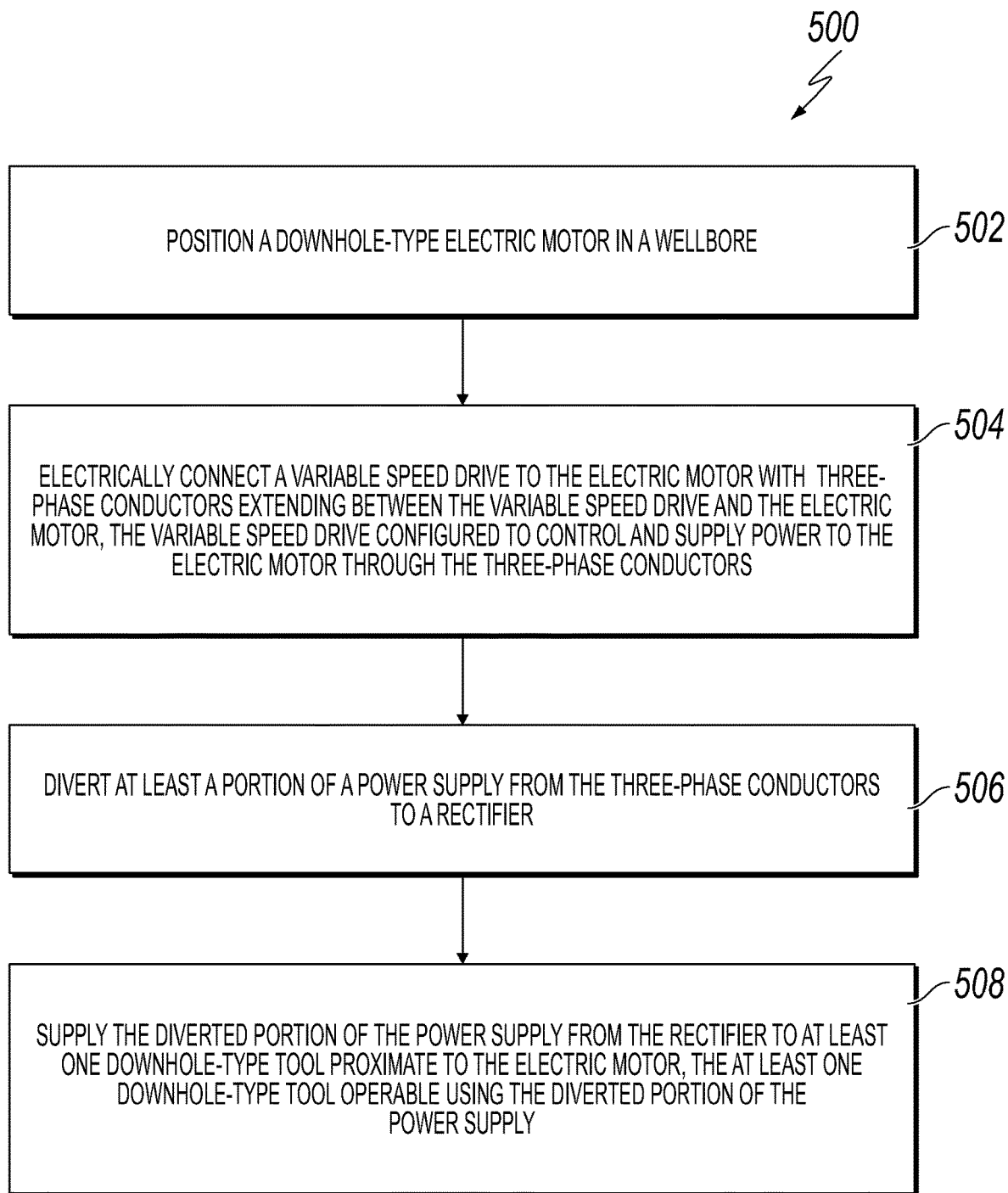
FIGS. 5-8 are flowcharts describing example methods for providing power to a downhole-type tool.

The components described previously within this disclosure can be used to implement the example method 500 shown in FIG. 5. For example, method 500 can be performed by the example motor drive system 200 of FIG. 2 and/or the example downhole-type system 124 of FIGS. 1 and 3. At 502, a downhole-type electric motor is positioned in a wellbore. At 504, a variable speed drive electrically connects to the electric motor with three-phase conductors extending between the variable speed drive and the electric motor. The variable speed drive is configured to control and supply power to the electric motor through the three-phase conductors. At 506, at least a portion of a power supply from the three-phase conductors is diverted to a rectifier. At 508, diverted portion of the power supply from the rectifier is supplied to at least one downhole-type tool proximate to the electric motor. The at least one downhole-type tool is operable using the diverted portion of the power supply.

Figure 6:
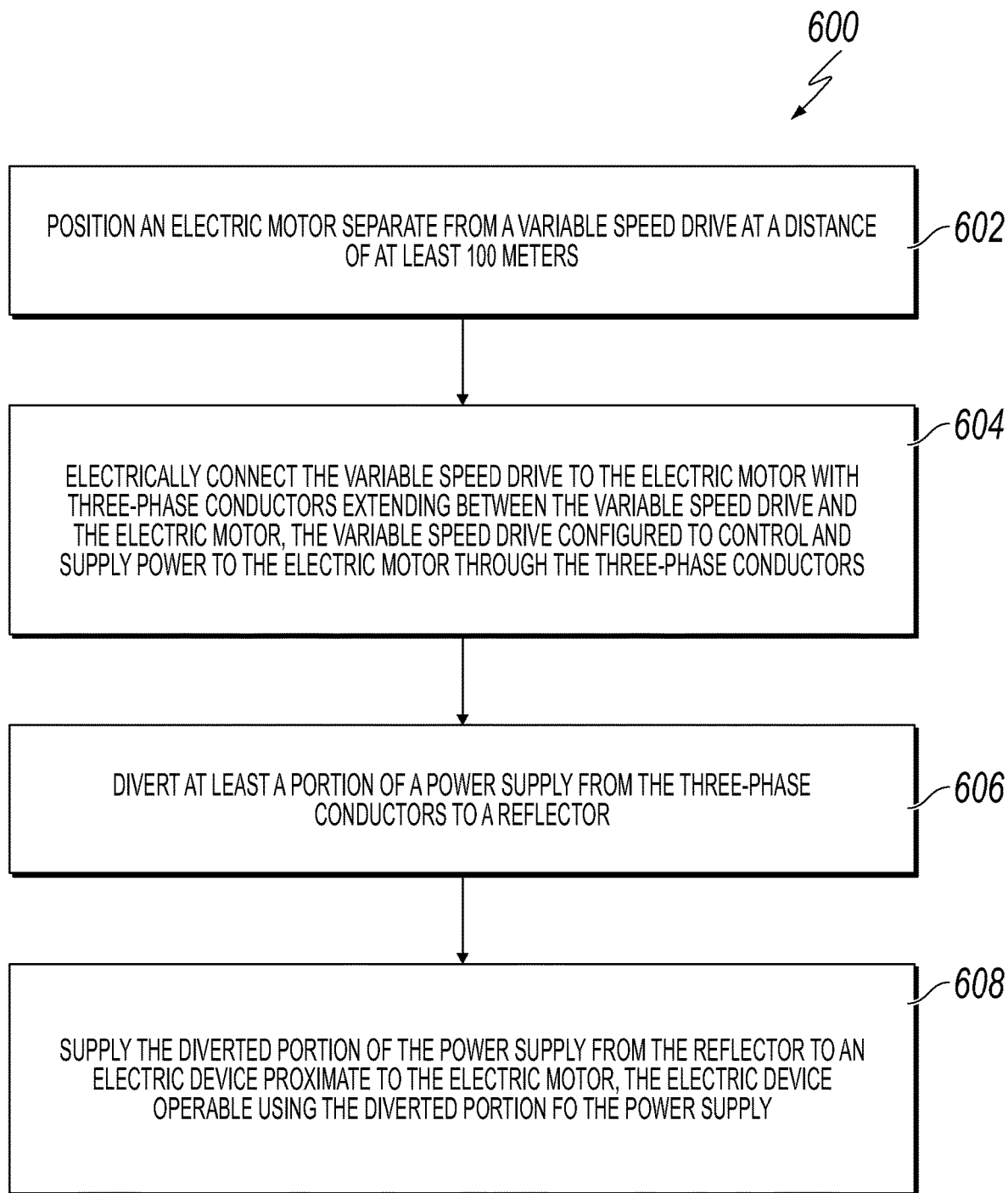

The components described previously within this disclosure can be used to implement the example method 600 shown in FIG. 6. For example, method 600 can be performed by the example motor drive system 200 of FIG. 2 and/or the example downhole-type system 124 of FIGS. 1 and 3. At 602, an electric motor is positioned separate from a variable speed drive at a distance of at least 100 meters. At 604, the variable speed drive is electrically connected to the electric motor with three-phase conductors extending between the variable speed drive and the electric motor. The variable speed drive is configured to control and supply power to the electric motor through the three-phase conductors. At 606, at least a portion of a power supply from the three-phase conductors is diverted to a rectifier. At 608, the diverted portion of the power supply from the rectifier is supplied to an electric device proximate to the electric motor, where the electric device is operable using the diverted portion of the power supply.

Figure 7:
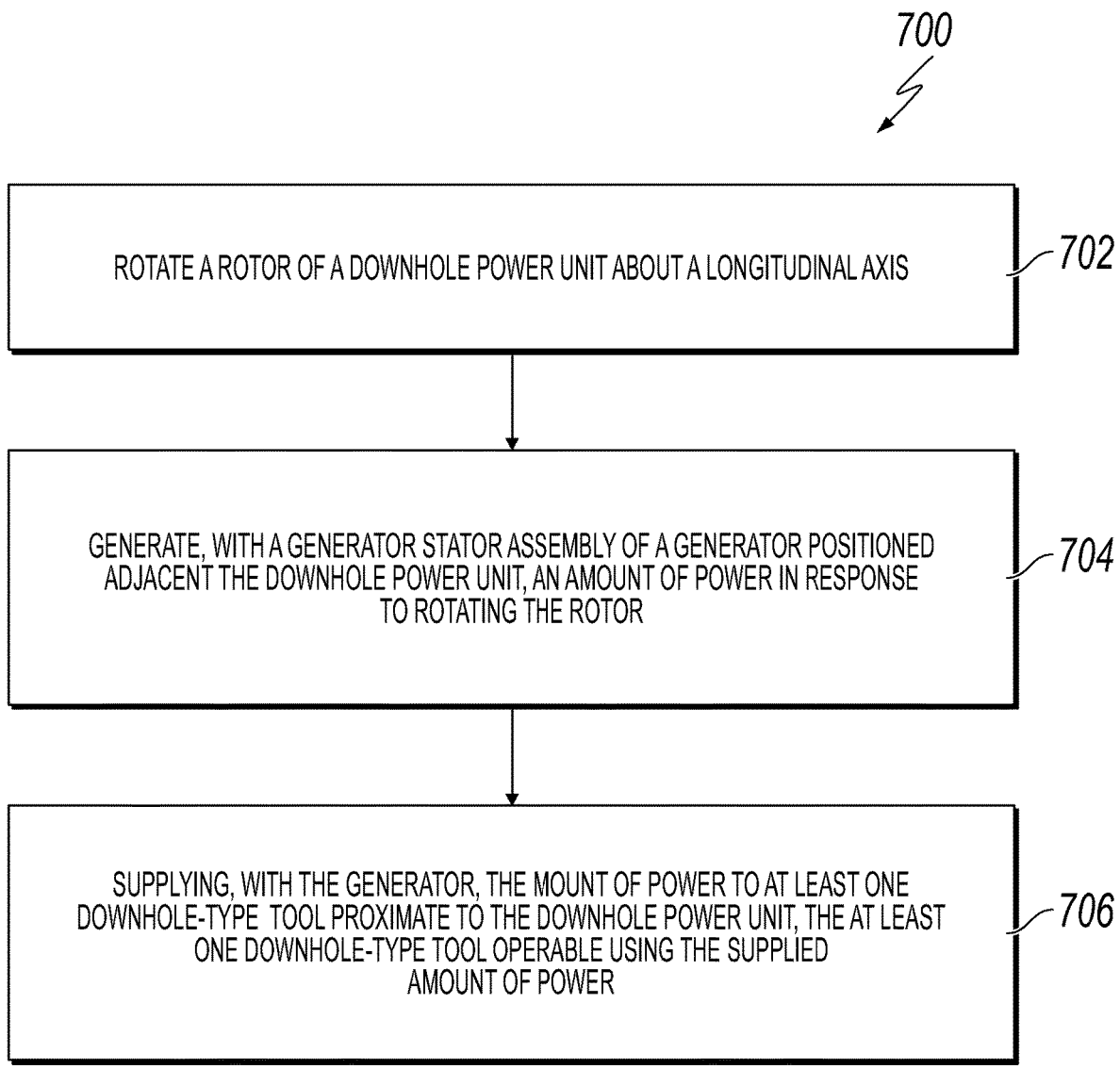

The components described previously within this disclosure can be used to implement the example method 700 shown in FIG. 7. For example, method 700 can be performed by the example motor drive system 200 of FIG. 2, the example downhole-type system 124 of FIGS. 1 and 3, and/or the example electric motors 400 and 420 of FIGS. 4A-4B. At 702, a rotor of a downhole power unit is rotated about a longitudinal axis. At 704, a generator stator assembly of a generator positioned adjacent the rotor of the downhole power unit generates an amount of power in response to rotating the rotor. At 706, the generator supplies the amount of power to at least one downhole-type tool proximate to the downhole power unit, where the at least one downhole-type tool is operable using the supplied amount of power.

Figure 8:
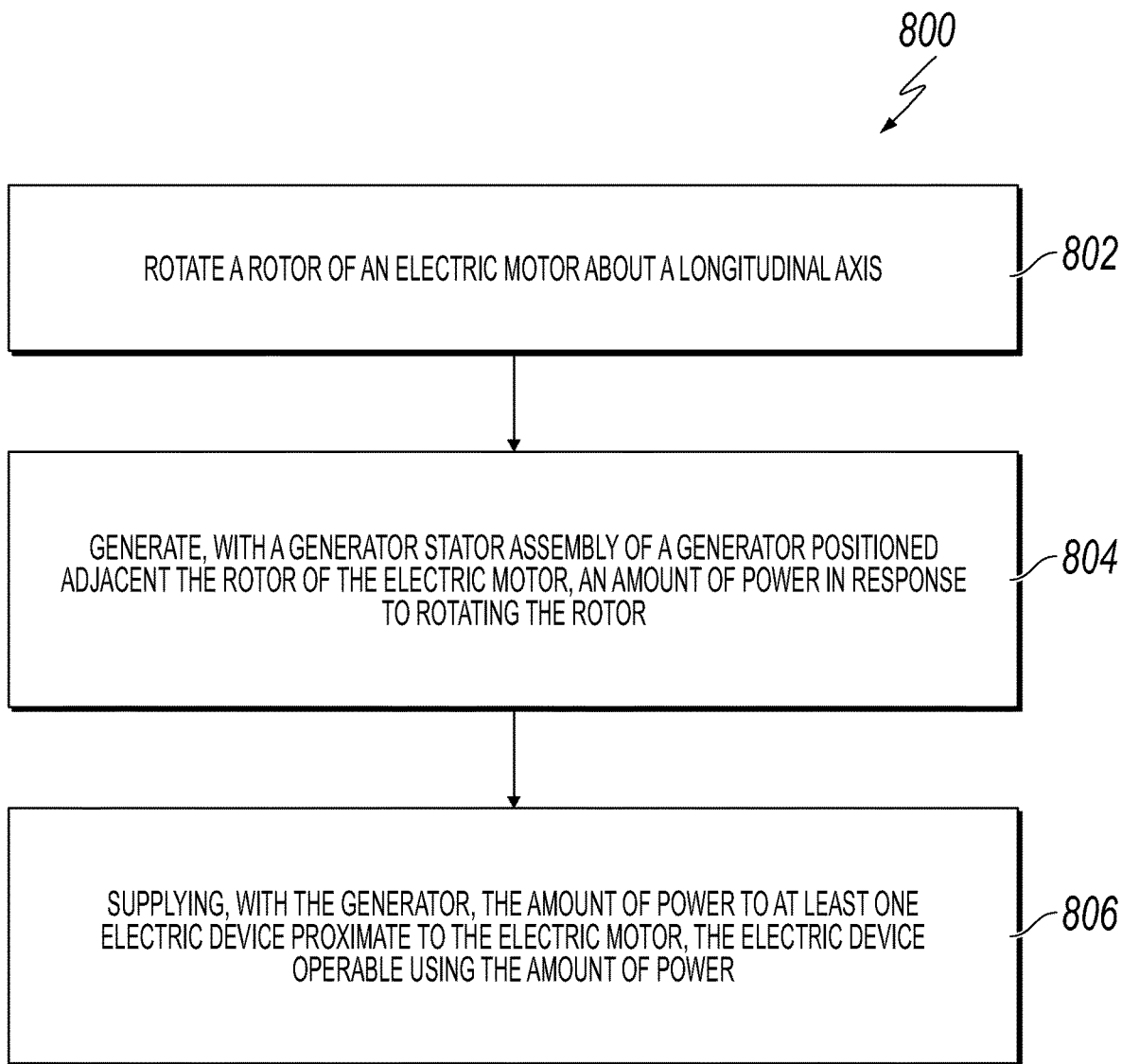

The components described previously within this disclosure can be used to implement the example method 800 shown in FIG. 8. For example, method 800 can be performed by the example motor drive system 200 of FIG. 2, the example downhole-type system 124 of FIGS. 1 and 3, and/or the example electric motors 400 and 420 of FIGS. 4A-4B. At 802, a rotor of an electric motor is rotated about a longitudinal axis. At 804, a generator stator assembly of a generator positioned adjacent the rotor of the electric motor generates an amount of power in response to rotating the rotor. At 806, the generator supplies the amount of power to at least one electric device proximate to the electric motor, where the electric device is operable using the supplied amount of power.

A number of implementations have been described. Nevertheless, it will be understood that various modifications may be made. Accordingly, other implementations are within the scope of the following claims.

What is claimed is:

1. A method for providing power to a downhole-type tool, comprising:
    positioning a downhole-type electric motor in a wellbore;
    electrically connecting a variable speed drive to the electric motor with three-phase conductors extending between the variable speed drive and the electric motor, the variable speed drive configured to control and supply power to the electric motor through the three-phase conductors;
    diverting at least a portion of a power supply from the three-phase conductors to a rectifier, where the rectifier comprises a voltage regulator; and
    supplying, from the rectifier, the diverted portion of the power supply to at least one downhole-type tool proximate to the electric motor, the at least one downhole-type tool operable using the diverted portion of the power supply, and where supplying the diverted portion of the power supply to the at least one downhole-type tool comprises smoothing an output voltage of the diverted portion of the power supply with the voltage regulator.

2. The method of claim 1, where electrically connecting the variable speed drive and the electric motor comprises supplying the power supply from the variable speed drive to the electric motor across the three-phase conductors.

3. The method of claim 1, where electrically connecting the variable speed drive and the electric motor comprises providing the power supply from the motor to the three-phase conductors, the power supply comprising a back electromotive force of the electric motor.

4. The method of claim 1, comprising, in response to diverting at least a portion of the power supply from the three-phase conductors to the rectifier, converting the diverted portion of the power supply with the rectifier to a direct current supply; and
    where supplying the diverted portion of the power supply to the at least one downhole-type tool proximate the electric motor comprises supplying the direct current supply to the at least one downhole-type tool.

5. The method of claim 1, where the variable speed drive is positioned at least 100 meters uphole of the electric motor.

6. The method of claim 5, where the variable speed drive is positioned at a tophole location of the wellbore.

7. The method of claim 1, where diverting at least a portion of the power supply from the three-phase conductors comprises directing the portion of the power supply through a secondary conductor connected to at least one of the three-phase conductors.

8. The method of claim 7, where the secondary conductor connects to the at least one of the three-phase conductors at a terminal of the electric motor.

9. The method of claim 1, where the voltage regulator comprises a buck converter, the buck converter to provide a constant voltage output to the at least one downhole-type tool.

10. The method of claim 1, where the voltage regulator comprises a buck-boost converter, the buck-boost converter to provide a constant voltage output to the at least one downhole-type tool.

11. The method of claim 1, where the at least one downhole-type tool comprises at least one of a sensor, a magnetic bearing, a generator, a damper, or a communication device.

12. A system for providing power to a downhole-type tool, comprising:
    a downhole-type electric motor configured to be positioned in a wellbore;
    a variable speed drive electrically connected to the electric motor by three-phase conductors extending between the variable speed drive and the electric motor, the variable speed drive configured to control and supply power to the electric motor through the three-phase conductors; and
    a rectifier electrically connected to at least one conductor of the three-phase conductors and comprising a voltage regulator, the rectifier configured to direct at least a portion of a power supply from the three-phase conductors and supply the at least a portion of the power supply to at least one downhole-type tool proximate to the electric motor, the voltage regulator configured to smooth an output voltage of the portion of the power supply, and the at least one downhole-type tool being operable using the portion of the power supply.

13. The system of claim 12, where the at least one downhole-type tool comprises at least one of a sensor, a magnetic bearing, a generator, a damper, or a communication device.

14. The system of claim 12, where the three-phase conductors are configured to provide the power supply from the variable speed drive to the electric motor.

15. The system of claim 12, where the electric motor is configured to supply a back electromotive force to the three-phase conductors, the portion of the power supply comprising the back electromotive force from the electric motor.

16. The system of claim 12, where the rectifier is configured to convert the portion of the power supply to a direct current supply and supply the direct current supply to the at least one downhole-type tool.

17. The system of claim 12, where the variable speed drive is positioned at least 100 meters uphole of the electric motor.

18. The system of claim 17, where the variable speed drive is positioned at a tophole location of the wellbore.

19. The system of claim 12, comprising a secondary conductor electrically connecting the at least one conductor of the three-phase conductors to the rectifier.

20. The system of claim 19, where the secondary conductor connects to the at least one of the three-phase conductors at a terminal of the electric motor.

21. The system of claim 12, where the voltage regulator comprises a buck converter, the buck converter configured to provide a constant voltage output to the at least one downhole-type tool.

22. The system of claim 12, where the voltage regulator comprises a buck-boost converter, the buck-boost converter configured to provide a constant voltage output to the at least one downhole-type tool.

23. A method for providing power to a downhole-type tool, comprising:
- positioning a downhole-type electric motor in a wellbore;
- electrically connecting a variable speed drive to the electric motor with three-phase conductors extending between the variable speed drive and the electric motor, the variable speed drive configured to control and supply power to the electric motor through the three-phase conductors;
- diverting at least a portion of a power supply from the three-phase conductors to a rectifier, where the diverting comprises directing the portion of the power supply through a secondary conductor connected to at least one of the three-phase conductors, where the secondary conductor connects to the at least one of the three phase conductors at a terminal of the electric motor; and
- supplying, from the rectifier, the diverted portion of the power supply to at least one downhole-type tool proximate to the electric motor, the at least one downhole-type tool operable using the diverted portion of the power supply.

24. The method of claim 23, where electrically connecting the variable speed drive and the electric motor comprises supplying the power supply from the variable speed drive to the electric motor across the three-phase conductors.

25. The method of claim 23, where electrically connecting the variable speed drive and the electric motor comprises providing the power supply from the motor to the three-phase conductors, the power supply comprising a back electromotive force of the electric motor.

26. The method of claim 23, comprising, in response to diverting at least a portion of the power supply from the three-phase conductors to the rectifier, converting the diverted portion of the power supply with the rectifier to a direct current supply; and
- where supplying the diverted portion of the power supply to the at least one downhole-type tool proximate the electric motor comprises supplying the direct current supply to the at least one downhole-type tool.

27. The method of claim 23, where the variable speed drive is positioned at least 100 meters uphole of the electric motor.

28. The method of claim 27, where the variable speed drive is positioned at a tophole location of the wellbore.

29. The method of claim 23, where the rectifier comprises a voltage regulator comprising a buck converter, where supplying the diverted portion of the power supply comprises smoothing an output voltage of the diverted portion of the power supply with the voltage regulator, the buck converter to provide a constant voltage output to the at least one downhole-type tool.

30. The method of claim 23, where the rectifier comprises a voltage regulator comprising a buck-boost converter, where supplying the diverted portion of the power supply comprises smoothing an output voltage of the diverted portion of the power supply with the voltage regulator, the buck-boost converter to provide a constant voltage output to the at least one downhole-type tool.

31. The method of claim 23, where the at least one downhole-type tool comprises at least one of a sensor, a magnetic bearing, a generator, a damper, or a communication device.

32. A system for providing power to a downhole-type tool, comprising:
- a downhole-type electric motor configured to be positioned in a wellbore;
- a variable speed drive electrically connected to the electric motor by three-phase conductors extending between the variable speed drive and the electric motor, the variable speed drive configured to control and supply power to the electric motor through the three-phase conductors; and
- a rectifier electrically connected to at least one conductor of the three-phase conductors, and a secondary conductor electrically connecting the at least one conductor of the three-phase conductors to the rectifier, where the secondary conductor connects to the at least one of the three-phase conductors at a terminal of the electric motor, the rectifier configured to direct at least a portion of a power supply from the three-phase conductors and supply the at least a portion of the power supply to at least one downhole-type tool proximate to the electric motor, the at least one downhole-type tool being operable using the portion of the power supply.

* * * * *